United States Patent [19]

Weber

[11] Patent Number: 4,658,610

[45] Date of Patent: Apr. 21, 1987

[54] CYLINDER LOCK

[75] Inventor: Günter Weber, Wuppertal, Fed. Rep. of Germany

[73] Assignee: Neiman S.A., Courbevoie, France

[21] Appl. No.: 722,475

[22] Filed: Apr. 12, 1985

[30] Foreign Application Priority Data

Apr. 14, 1984 [DE] Fed. Rep. of Germany ....... 3414277

[51] Int. Cl.⁴ ........................ E05B 65/12; B60R 25/02

[52] U.S. Cl. ........................................ 70/252; 70/245; 70/182

[58] Field of Search ................................ 70/182-186, 70/245, 252

[56] References Cited

U.S. PATENT DOCUMENTS

| | | | |
|---|---|---|---|
| 3,650,131 | 3/1972 | Eichenauer | 70/252 |
| 3,724,244 | 4/1973 | Schaumberg | 70/252 |
| 3,940,958 | 3/1976 | Kuroki | 70/252 |
| 4,052,869 | 10/1977 | Weber | 70/252 |
| 4,248,070 | 2/1981 | Eichenauer | 70/252 |
| 4,276,761 | 7/1981 | Eichenauer | 70/252 |

FOREIGN PATENT DOCUMENTS

| | | | |
|---|---|---|---|
| 2059215 | 11/1980 | Fed. Rep. of Germany | 70/252 |
| 8304228 | 12/1983 | World Int. Prop. O. | 70/252 |
| 1296972 | 11/1972 | United Kingdom | 70/252 |

*Primary Examiner*—Thomas J. Holko
*Assistant Examiner*—Suzanne L. Dino
*Attorney, Agent, or Firm*—Dowell & Dowell

[57] ABSTRACT

A cylinder lock comprises a cylinder core movable axially by the key and with at least one lock part in particular a lock bolt, which can be actuated by the cylinder core and which is movable via a transmission part by an eccentric member, cam or cam plate actuable by the cylinder core into the non-locking position. The lock part (8, 9) is held in the non-locking position by a tiltable dished plate (20) adapted for movement towards the cylinder core (1) axially against the pressure of spring (22) and disposed coaxially of the cylinder axis, until withdrawal of the key causes the cylinder core (1) to be moved back into the starting position, the plate (20) being withdrawn from the position which locks the transmission part (14). On the side remote from the cylinder core (1), the plate (20) has an inclined face **(20*b*) along which moves a cam follower (18) attached to the transmission part (14), in order to move the plate (20) towards the cylinder core (1) against spring pressure. On the side of the plate (20) which is towards the cylinder core, there is a coaxially disposed axially movable ring (21) biased by a second spring (23) acting in the same direction as the first spring (22), the said ring (21) being tiltable against the pressure of this spring (23) by the plate (20)**.

5 Claims, 4 Drawing Figures

CYLINDER LOCK

BACKGROUND TO THE INVENTION

The invention relates to a cylinder lock, particularly a steering lock for a motor vehicle, having a cylinder core adapted to be moved axially by a key, and with at least one lock part, particularly a lock bolt, which can be actuated by the cylinder core and which can be moved into the non-locking position by an eccentric member, cam or cam plate adapted to be actuated by the cylinder core.

STATEMENT OF PRIOR ART

Such a cylinder lock is already known from DAS 24 41 463. When the key is pushed in, two rollers have to be displaced against spring pressure so that insertion of a key requires greater force than with other locks.

Furthermore, it is known from U.S. Pat. No. 4,052,869 for a disc axially parallel or coaxial with the cylinder core to be mounted not only rotatable but also tiltable in order to maintain the lock bolt in a position of readiness for locking and to terminate this situation when the key is removed.

OBJECT OF THE INVENTION

An object of the invention is so to improve a lock of the type described at the outset that spring pressure does not have to be overcome when the key is inserted.

SUMMARY OF THE INVENTION

According to the invention there is provided a cylinder lock comprising (a) a housing, (b) at least one locking element movable between a non-locking position and a locking position, (c) a cylinder core provided with an axial key entry channel and being rotatable within said housing and axially movable between an outer position and an inner position in relation to housing, (d) a transmission element within said housing movable between a non-locking and a locking position capable of permitting movement of said locking its non-locking position and to its locking position according to the disposition of said transmission element, (e) a cam follower connected to said transmission element and extending axially of the cylinder core, (f) a cam element rotatable by said cylinder core having a cam surface engaged by said cam follower, said cam surface including a first portion along which the cam is effective to move the transmission element from the locking position to the non-locking position and a second portion along which the cam is effective to maintain said transmission element in the non-locking position, (g) a circular dished plate having a sloping exterior rim coaxially disposed on the cylinder core axis between said cam element and said cylinder core, (h) first spring means between said dished plate and said cylinder core, (i) a ring engageable with the exterior marginal region of the dished plate, and (j) second spring means between said ring and said cylinder core, whereby on axial movement of the cylinder core to its inner position and hence also the axial shifting of the cam element, the plate and the ring, the axial distal end of the cam follower enters the space within the dished plate, rotation of the cam element causing the cam follower to move away from the cylinder core axis and to effect tilting of the dished plate and said ring by engagement of said axial distal end of the cam follower against the interior surface of the rim until the cam follower has moved radially beyond the rim whereupon said dished plate returns under the action of said first spring means towards the cam element leaving said ring tilted with the second spring means under tension and said cam element engaging the exterior of the rim, said cam follower being permitted to return towards the axis of the cylinder core only on axial movement of the dished plate which effects disengagement of the cam follower from the rim brought about by axial movement of the cylinder core to its outer position under the influence of the second spring means upon withdrawal of the key from the cylinder core.

Where this embodiment is concerned, the spring pressure which is necessary so that, after withdrawal of the key, the cylinder core can be moved into the outer position in which the readiness for locking situation is cancelled, is created in that the spring pressure necessary is built up by rotation of the key. Whereas the cylinder core is not subjected to spring pressure when the key is inserted and thus can occupy various axial positions and easily accommodates the key in any of these positions, a specific arrangement, in particular a pair of rollers, ensures that after the key has been inserted, the cylinder core can no longer occupy the outer position, so that the spring pressure built up by rotation of the key cannot bring about a movement of the cylinder core into the outer position. This outer position is not occupied by the cylinder core until after the key has been completely withdrawn and the cylinder core moved into that position by the spring pressure which has been built up in the meantime.

Furthermore, the embodiment has the advantages of simple construction and inexpensive manufacture, since most parts, particularly also the parts which build up the spring pressure and which create the position of readiness to lock, can be rotationally symmetrical. This also provides high functional reliability and very easy installation, since it is immaterial which rotary position the rotationally symmetrical parts occupy.

BRIEF DESCRIPTION OF DRAWINGS

By way of example, an embodiment of the invention is described in greater detail hereinafter and is illustrated in the accompanying drawings, in which.

DESCRIPTION OF PREFERRED EMBODIMENTS

The embodiment shows a type of lock such as is described in detail in the not pre-published patent applications P 32 42 534.1 and P 33 33 648.2. Reference is made to these two patent applications in connection with the mode of operation of the two lock bolts and their actuation by a driver plate.

Figure 2:
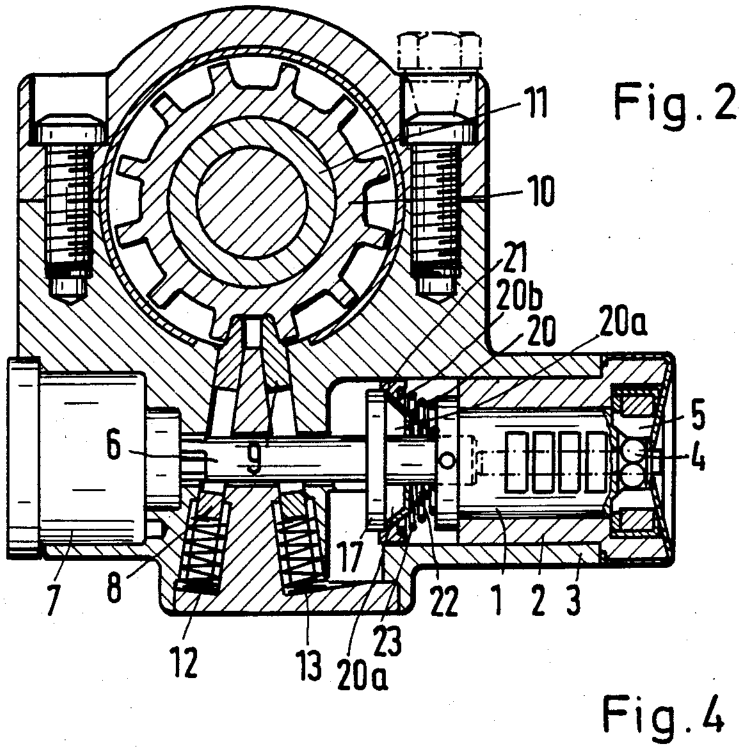
FIG. 2 shows a cross-section through the steering column according to II—II in FIG. 1 when the key is withdrawn.

A cylinder core 1 is rotatably mounted coaxially in a lock barrel 2 which is located in a lock housing 3. In the cylinder core, on the key insertion side, the key passage is blocked by two rollers 4 when the cylinder core is in the outer position shown in FIG. 2, the two rollers bearing one against the other and being externally guided by cam members 5 which prevent the rollers moving outwardly in this position. This design is described in detail in DAS 24 41 463. Only after movement of the cylinder core 1 inwardly within the lock do the rollers arrive at opposed inclined surfaces of the cam members 5 so that they are free to move outwardly in opposite directions. This occurs by pushing in the key or may also occur by chance by the forces of inertia, since in the key withdrawal position the cylinder core is not spring biased and so can move freely and axially into both positions.

Coaxially moulded onto the inner end of the cylinder core 1 is a spindle-shaped extension 6, which ends in and actuates an electrical switch 7 of the lock. Between the cylinder core 1 and the switch 7, the extension 6 traverses two lock bolts 8, 9 which in the locking position penetrate the recesses in a stellate bush 10 which is non-rotatably disposed on the steering column 11.

Figure 4:
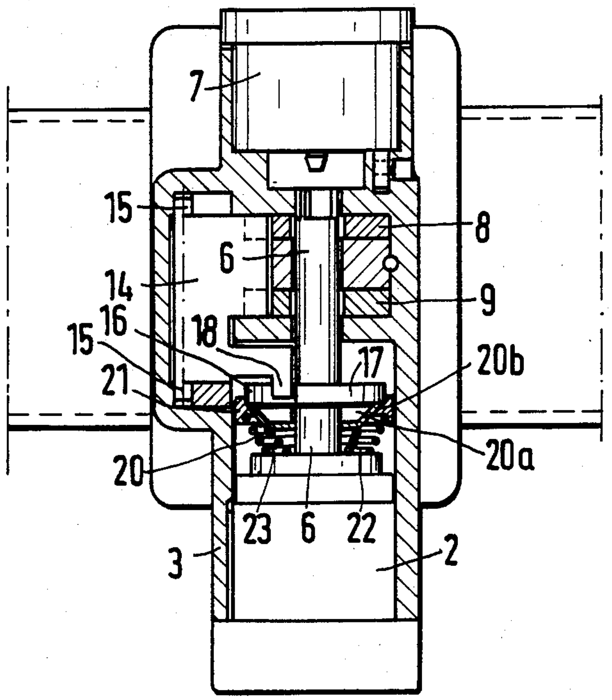
FIG. 4 shows a section according to IV—IV in FIG. 1 when the key is being withdrawn.

The lock bolts 8, 9 are respectively biased towards the steering column by return springs 12, 13 and are movable against the pressure of these springs into the releasing position by a driver plate 14 which is pivotable about an axis 15 parallel with the axis of the cylinder core. For actuation of the two plate-like lock bolts 8, 9, the latter have recesses 16 into which the driver plate engages. To actuate the driver plate 14 there is on the extension 6 an integral and coaxial cam plate 17 disposed transversely of the axis of the extension 6. The effective cam surface comprises a portion which is circular over approx. 250 degrees, and in the remaining angular range a valley portion formed by a cut-out. The driver plate 14 is provided with a finger 18 extending parallel with the axis 15, and serving as a cam follower engageable with the cam surface. If after insertion of the key, the cam plate 17 is rotated out of the position shown in FIGS. 2 and 4, the valley portion of the cam surface in the cam plate 17 causes the finger 18 to move away from the axis of the extension 6 and thus also the driver plate 14 which by pivoting withdraws the lock bolts 8, 9 from their locking position. The finger 18 remains then in the travelling and starting position on the circular portion of the cam plate 17, so that the lock bolts remain in the released position.

In the intermediate space between the cam plate 17 and the inner end of the cylinder core 1 there is coaxially mounted on the extension 6 a circular plate 20 which has in the centre a circular aperture traversed by the extension 6. The plate 20 is provided with a frustoconical rim **20*b* defining with said plate a depression 20*a*. The diameter of the rim 20*b* decreases in a direction from the plate 17 towards the cylinder core 1. The outside diameter of the rim 20*b* is equal to or is just a little greater than the circular zone of the cam plate 17. The plate 20 is enclosed by a ring 21 which lies coaxially with the cylinder axis and, like the plate 20, is adapted to be slideable and to a limited degree tiltable or pivotable in relation to the extension 6. The plate 20 and the ring 21 are respectively pressed away from the cylinder core 1 towards the cam plate 17 by frusto-conical coil springs 22, 23, the two springs being disposed coaxially of each other and of the extension 6, the spring 22 of the plate being enclosed within the spring 23 of the ring. The smaller diameter ends of the springs 22, 23 bear on the inner end of the cylinder core 1 while their opposite ends bear on the plate 20 and the ring 21 respectively. The rim 20*b* of the plate 20 is pressed by the spring 22 against the side face of the cam plate 17 while the ring 21 engages the outer marginal region of the rim 20*b***.

Figure 1:
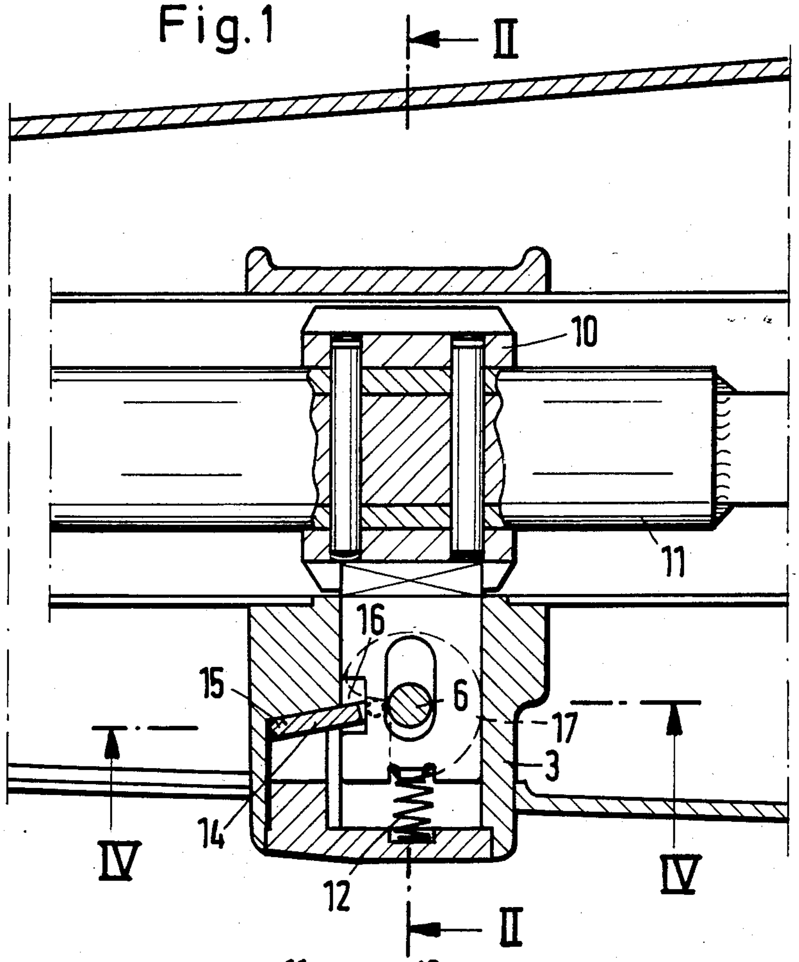
FIG. 1 shows a longitudinal section through a steering column of a motor vehicle.
Figure 3:
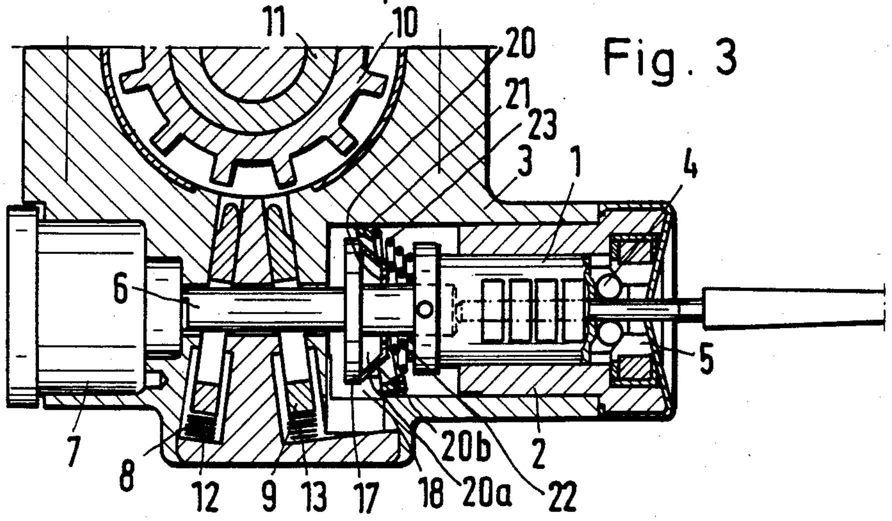
FIG. 3 shows a section corresponding to FIG. 2 with the key inserted and the lock in the position of readiness.

If, in the position of key withdrawal, the cylinder core 1 is in the inwardly displaced position, then the finger 18 protrudes into the depression **20*a* of the plate 20. This happens even when the key is inserted into the cylinder core since in the event of the cylinder core happening to assume the outer axial position, the cylinder core with the extension 6 and the parts 17 and 20 to 23 disposed thereon will be moved towards the inner position. If, then, in this position, the cylinder core is rotated by the key, then the valley portion of the cam plate 17 will pivot the driver plate 14 in order to withdraw the lock bolts 8, 9 from the locking position. During the pivoting movement of the driver plate 14, the finger 18 arrives at the rim 20*b* of the plate 20 and tilts or pivots the plate 20 together with the ring 21 and against the pressure of the two springs 22, 23. When the finger 18 has reached the outer circular portion of the cam plate 17, the finger 18 is farther from the axis of the extension 6 than the radius of the plate 20, so that the plate 20 clicks back into the position at a right-angle to the axis by virtue of the pressure of the spring 22. However, the ring 21 which has a larger diameter than the cam plate 17 remains in engagement with the end of the finger 18 so that the ring 21 remains tilted. In consequence, the spring 23 remains tensioned so that after the key is turned back into the key insertion position and thus into the position of readiness to lock (FIG. 3), the cylinder core is subjected to pressure outwardly by the spring 23 since the ring 21 is further braced on the finger 18. On commencement of withdrawal of the key, the cylinder core 1 which has been rotated to a withdrawal position remains in the inner position since the rollers 4 prevent movement of the cylinder core 1 back into the outer position as the key is disposed between the rollers 4. The rollers 4 in this case bear with a locking effect on the inner ends of the cam members 5**.

When the key is completely withdrawn, the rollers 4 permit an outwards movement of the cylinder core so that the spring 23 presses the cylinder core outwardly, the cylinder core entraining with it the plate 20 and the cam plate 17. As a result, the plate 20 disengages the finger 18 whereby the latter cam enter the valley portion of the cam plate 17. The driver plate 14 thus pivots under the influence of the return springs 12, 13 thereby permitting the lock bolts 8, 9 to move towards the steering spindle so that at least one of the two lock bolts drops into one of the recesses in the bush 10.

I claim:

1. A cylinder lock comprising (a) a housing, (b) at least one locking element movable between a non-locking position and a locking position, (c) a cylinder core provided with an axial key entry channel and being rotatable within said housing and axially movable between an outer position and an inner position in relation to housing, (d) a transmission element within said housing movable between a non-locking and a locking position capable of permitting movement of said locking element respectively to its non-locking position and to its locking position according to the disposition of said transmission element, (e) a cam follower connected to said transmission element and extending axially of the cylinder core, (f) a cam element rotatable by said cylinder core having a cam surface engaged by said cam follower, said cam surface including a first portion along which the cam is effective to move the transmission element from the locking position the non-locking position and a second portion along which the cam is effective to maintain said transmission element in the non-locking position, (g) a circular dished plate having a sloping exterior rim coaxially disposed on the cylinder core axis between said cam element and said cylinder core, (h) first spring means between said dished plate and said cylinder core, (i) a ring engageable with the exterior marginal region of the dished plate, and (j) second spring means between said ring and said cylinder core, whereby on axial movement of the cylinder core to its inner position and hence also the axial shifting of the cam element, the plate and the ring, the axial distal end of the cam follower enters the space within the dished plate, rotation of the cam element causing the cam follower to move away from the cylinder core axis and to effect tilting of the dished plate and said ring by engagement of said axial distal end of the cam follower against the interior surface of the rim until the cam follower has moved radially beyond the rim whereupon said dished plate returns under the action of said first spring means towards the cam element leaving said ring tilted with the second spring means under tension and said cam element engaging the exterior of the rim, said cam follower being permitted to return towards the axis of the cylinder core only on axial movement of the dished plate which effects disengagement of the cam follower from the rim brought about by axial movement of the cylinder core to its outer position under the influence of the second spring means upon withdrawal of the key from the cylinder core.

2. A cylinder lock according to claim 1, wherein a cylindrical extension is provided on said cylinder core coaxially therewith, said extension having fixed thereto said cam element at a predetermined distance from said cylinder core, said dished plate, ring, first and second spring means being disposed between said cam element and said cylinder core, said dished plate having an aperture therein through which passes said extension with a sliding fit.

3. A cylinder lock according to claim 2, wherein said first and second spring means are conical and are concentrically arranged on said extension, said second spring means surrounding said first spring means.

4. A cylinder lock according to claim 3, including rotary switch means disposed within said housing, said switch being operable by said extension on rotation thereof by said cylinder core.

5. A cylinder lock according to claim 1, including a return spring within said housing which effects biasing of said locking element towards its locking position, said return spring being placed under compression as said transmission element is moved to its non-locking position.

* * * * *